United States Patent [19]
Mueller

[11] 3,976,196
[45] Aug. 24, 1976

[54] PACKAGING SYSTEM
[75] Inventor: Martin Mueller, Glenview, Ill.
[73] Assignee: Owens-Illinois, Inc., Toledo, Ohio
[22] Filed: July 22, 1974
[21] Appl. No.: 490,362

Related U.S. Application Data
[62] Division of Ser. No. 282,758, Aug. 22, 1974, Pat. No. 3,838,550.

[52] U.S. Cl. ............................. 206/526; 206/820; 229/43; 206/484
[51] Int. Cl.² ......................................... B65D 85/62
[58] Field of Search ........... 206/390, 484, 498, 820, 206/411, 526; 229/43, 7 R

[56] References Cited
UNITED STATES PATENTS

| 2,197,739 | 4/1940 | Bensel | 229/7 R |
|---|---|---|---|
| 3,054,679 | 9/1962 | Bradford | 229/43 |
| 3,443,741 | 5/1969 | Stockdale | 229/43 |
| 3,503,493 | 3/1970 | Nagy | 206/820 |

Primary Examiner—William T. Dixson, Jr.
Attorney, Agent, or Firm—Dressler, Goldsmith, Clement, Gordon & Shore, Ltd.

[57] ABSTRACT

A method and apparatus for packaging products in containers while the containers are continuously moving along a path is disclosed herein. The containers are sequentially dropped from a nested stack towards an apertured conveyor that defines the path for the containers and a negative pressure is produced below the conveyor to assist in drawing the containers into the apertures of the conveyor. The conveyor moves the containers to a filling station where the product is flowed into the containers at several different locations, so that the containers are filled in stages while being moved by the conveyor. The filled containers then progress to a cover applying station and are preferably arranged in at least a pair of rows with a continuous web of heat sealable cover film heat sealed to the filled containers at the cover applying station.

In one embodiment, the continuous web of material is then severed longitudinally and transversely between each adjacent pair of containers to produce rectangular covers and the periphery of the covers are folded under the rim of the container by automatic folding means.

In another embodiment, the web is only partially severed between groups of containers while the web in the remaining areas forms an interconnection between adjacent containers and the severed portions of the webs are folded downwardly to produce an interconnected group of filled containers.

In both embodiments, the apparatus includes novel heating and pressure applying means for sealing the web to the container rims and simplified structure for severing the webs at selected locations. The severing mechanism produces individual separated containers, each having four gripping tabs on the cover, in one embodiment while producing interconnected groups of containers in the alternate embodiment with each container having four gripping tabs on the cover.

7 Claims, 22 Drawing Figures

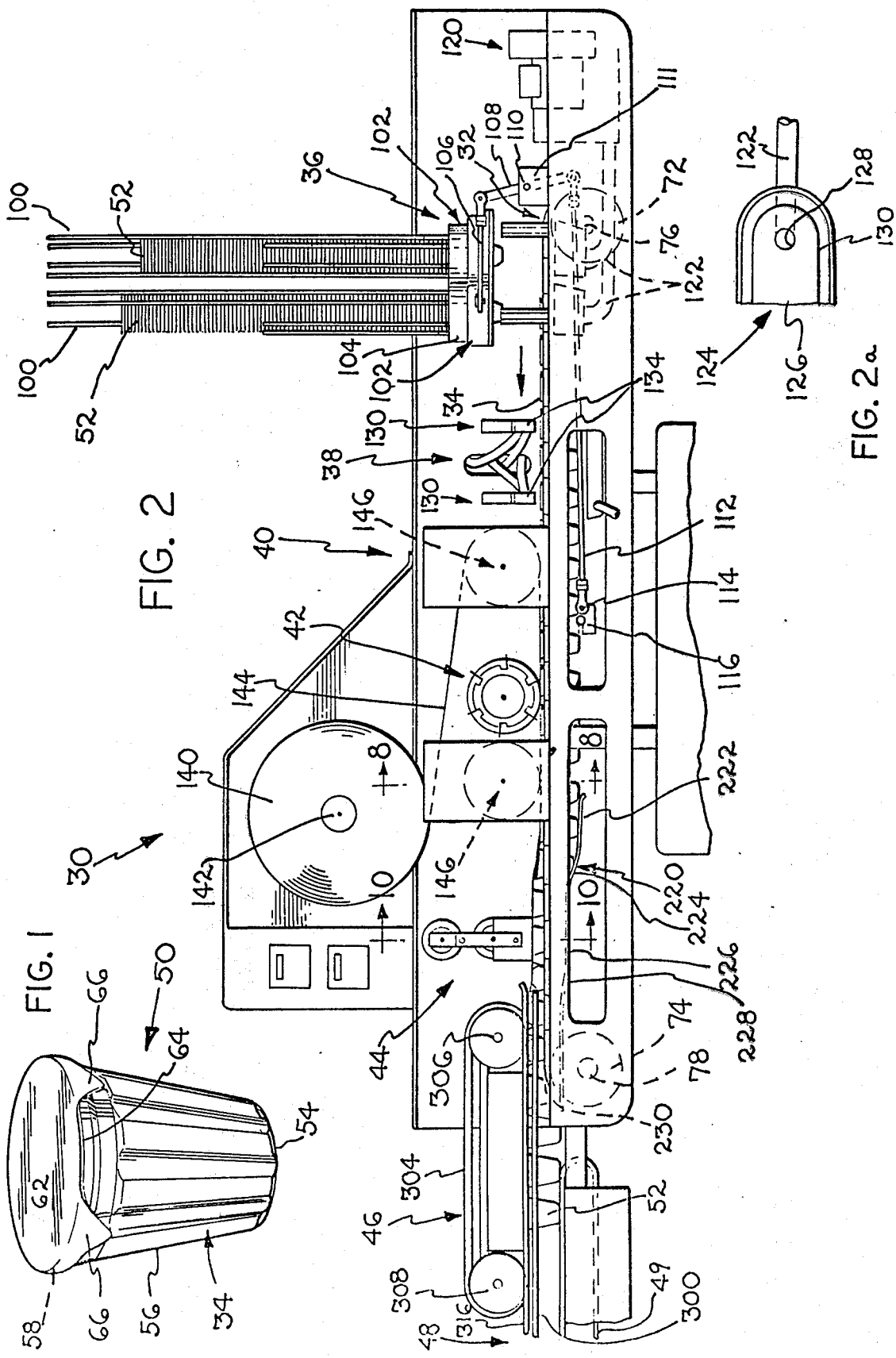

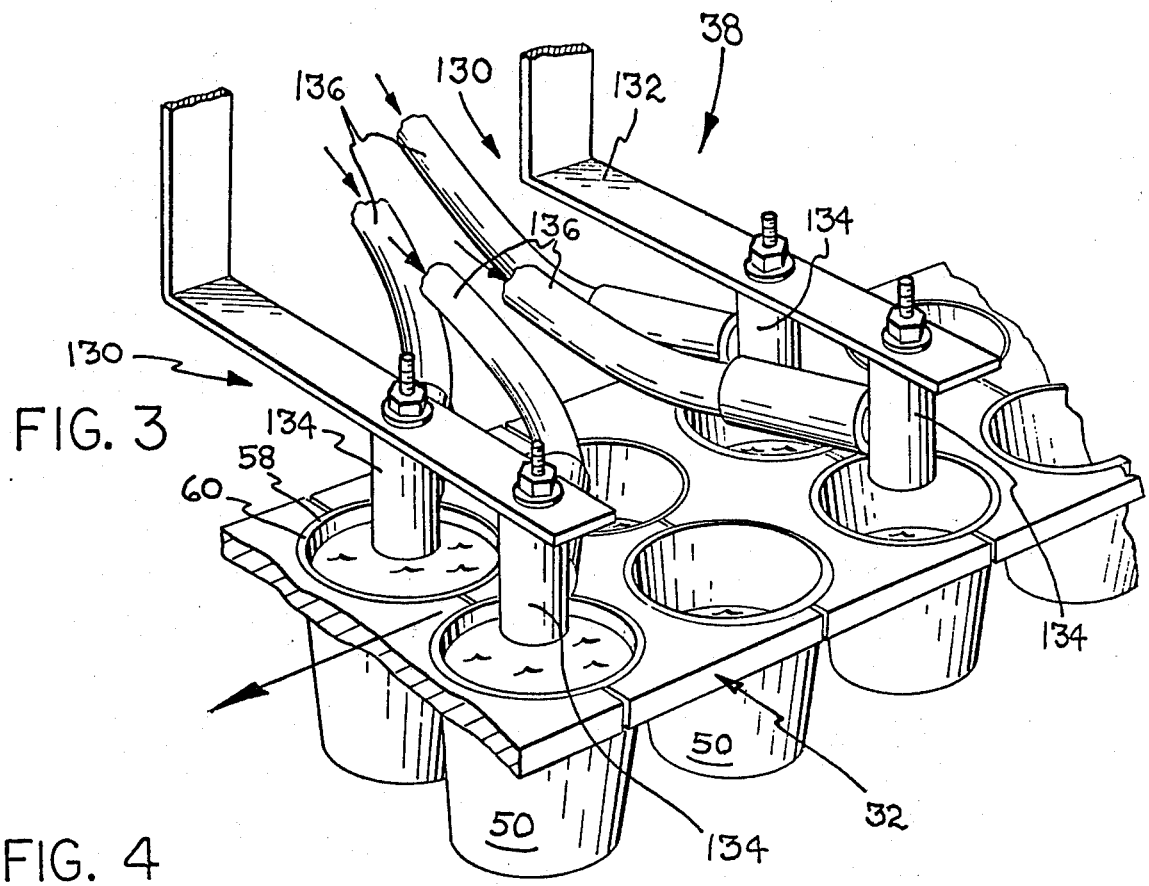
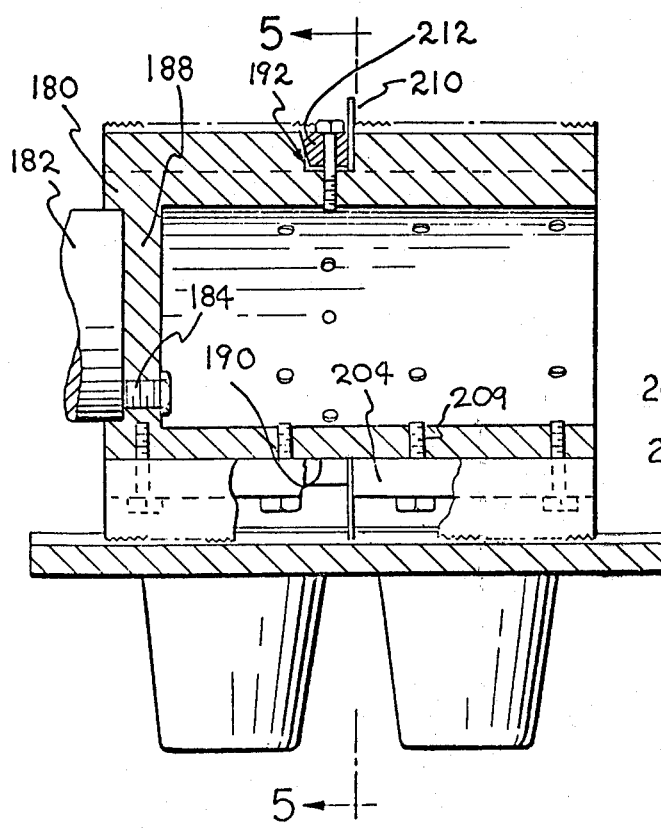
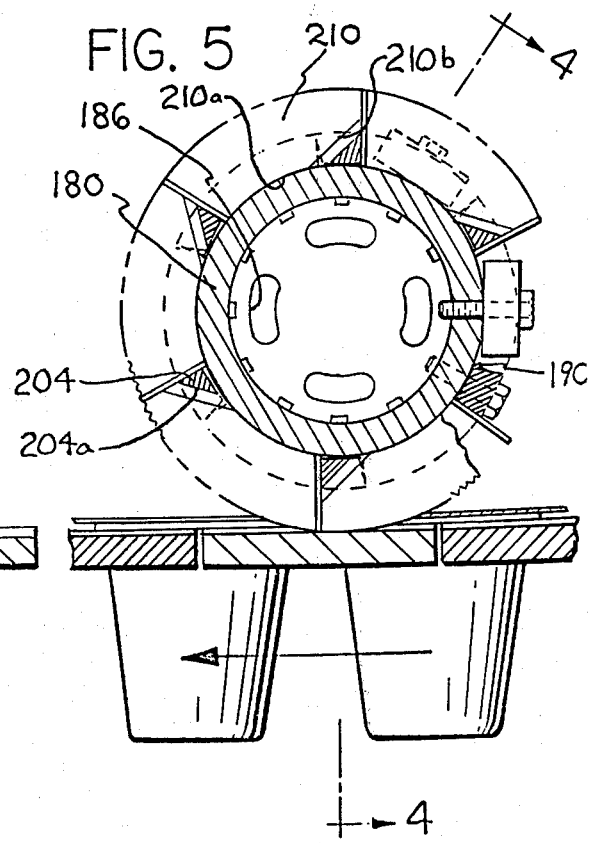

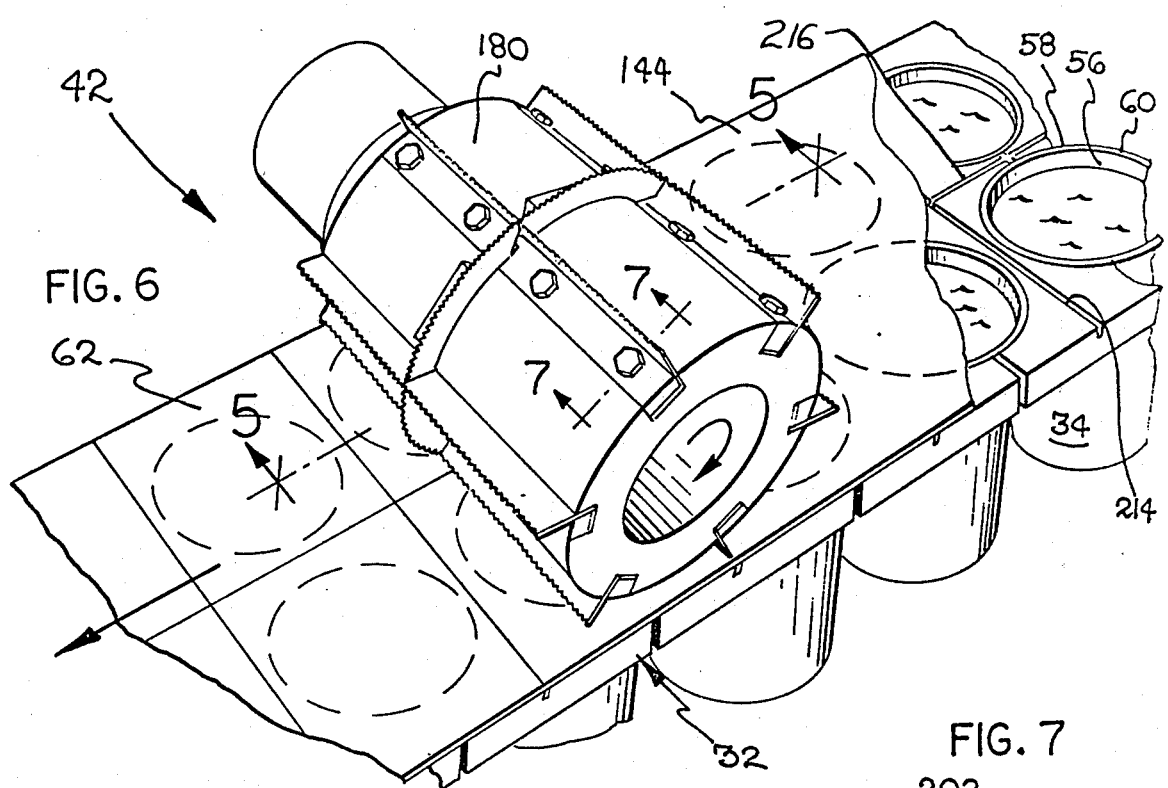
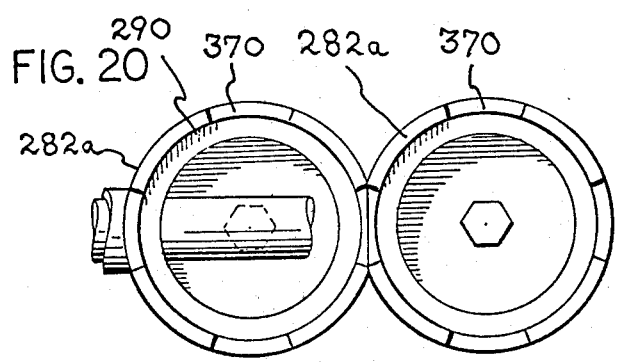
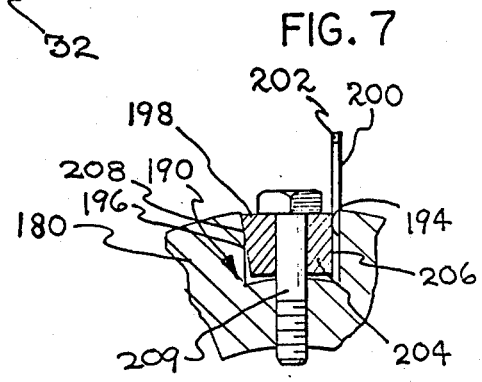
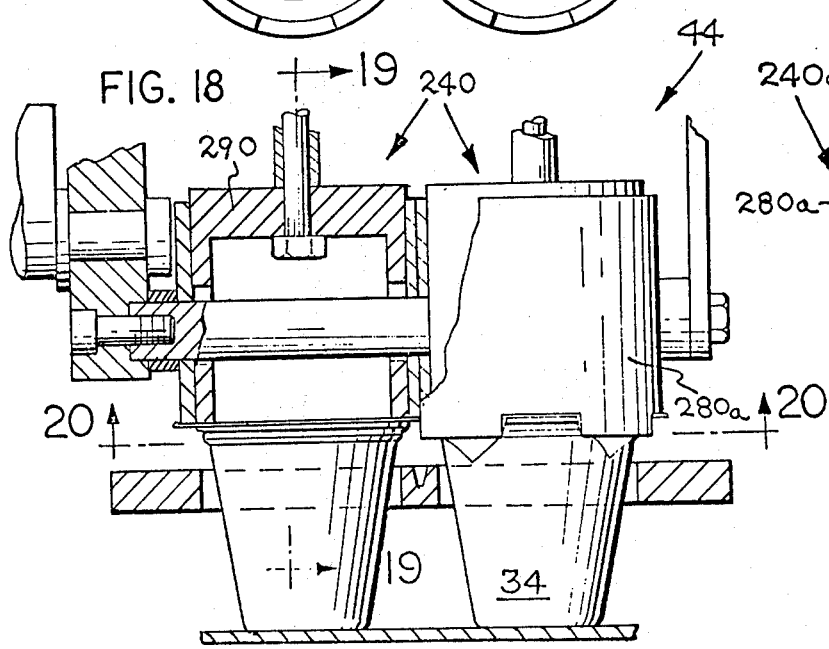
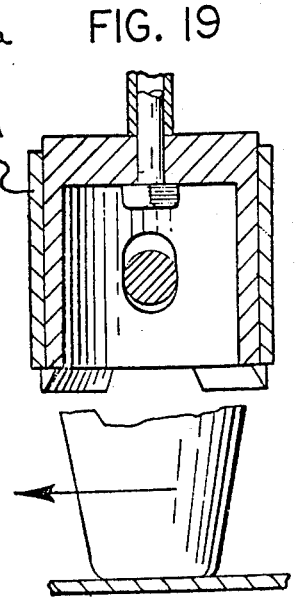

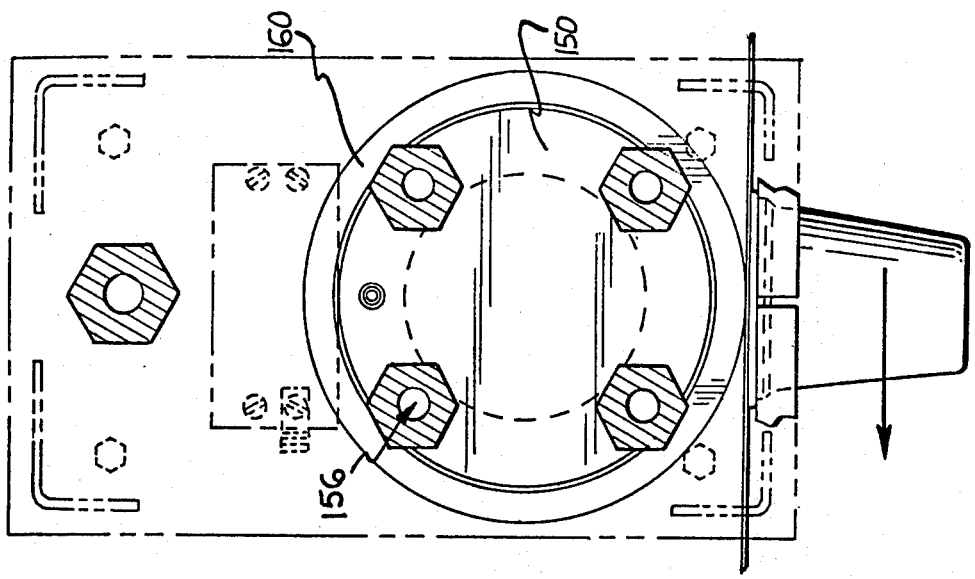
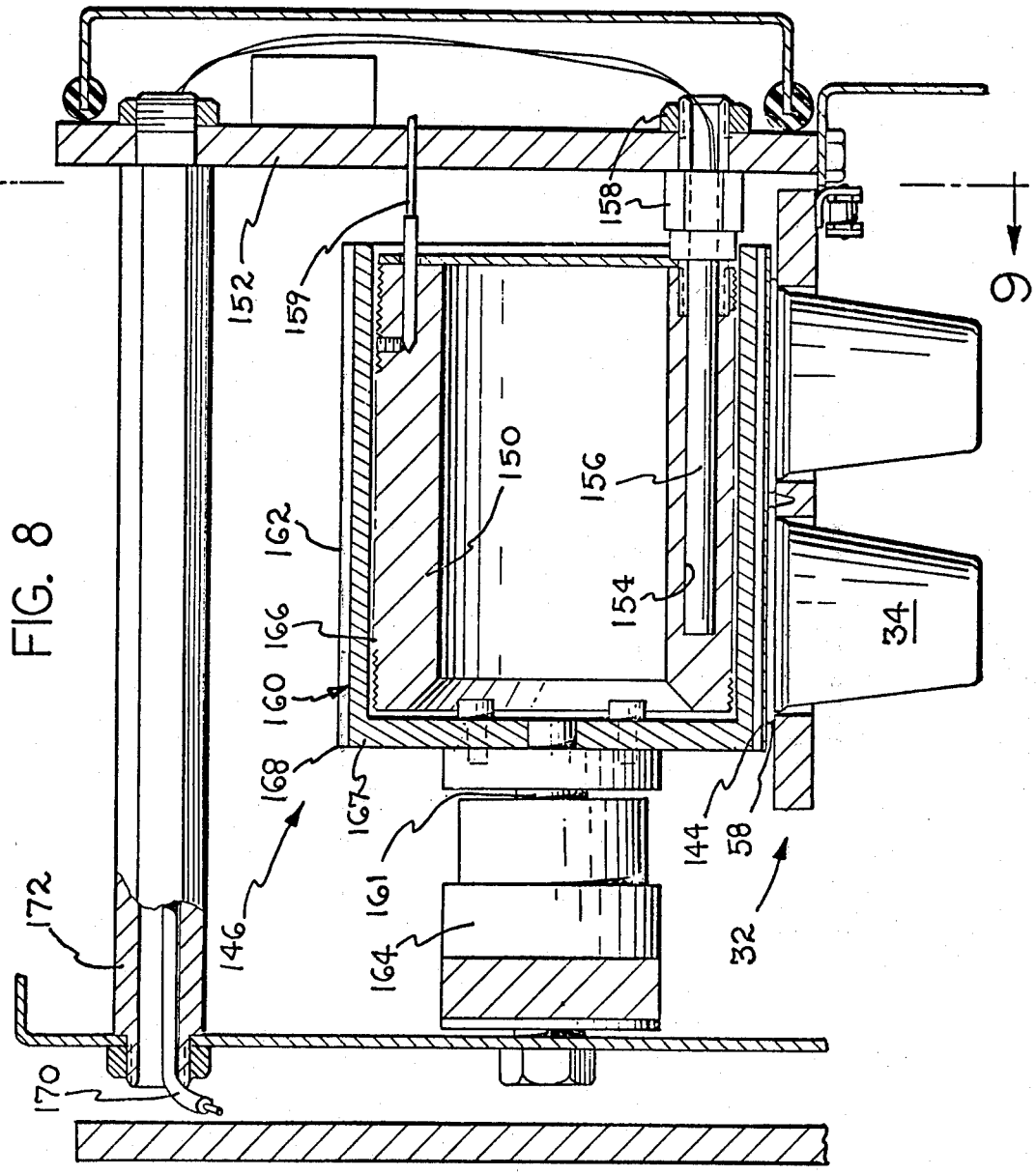

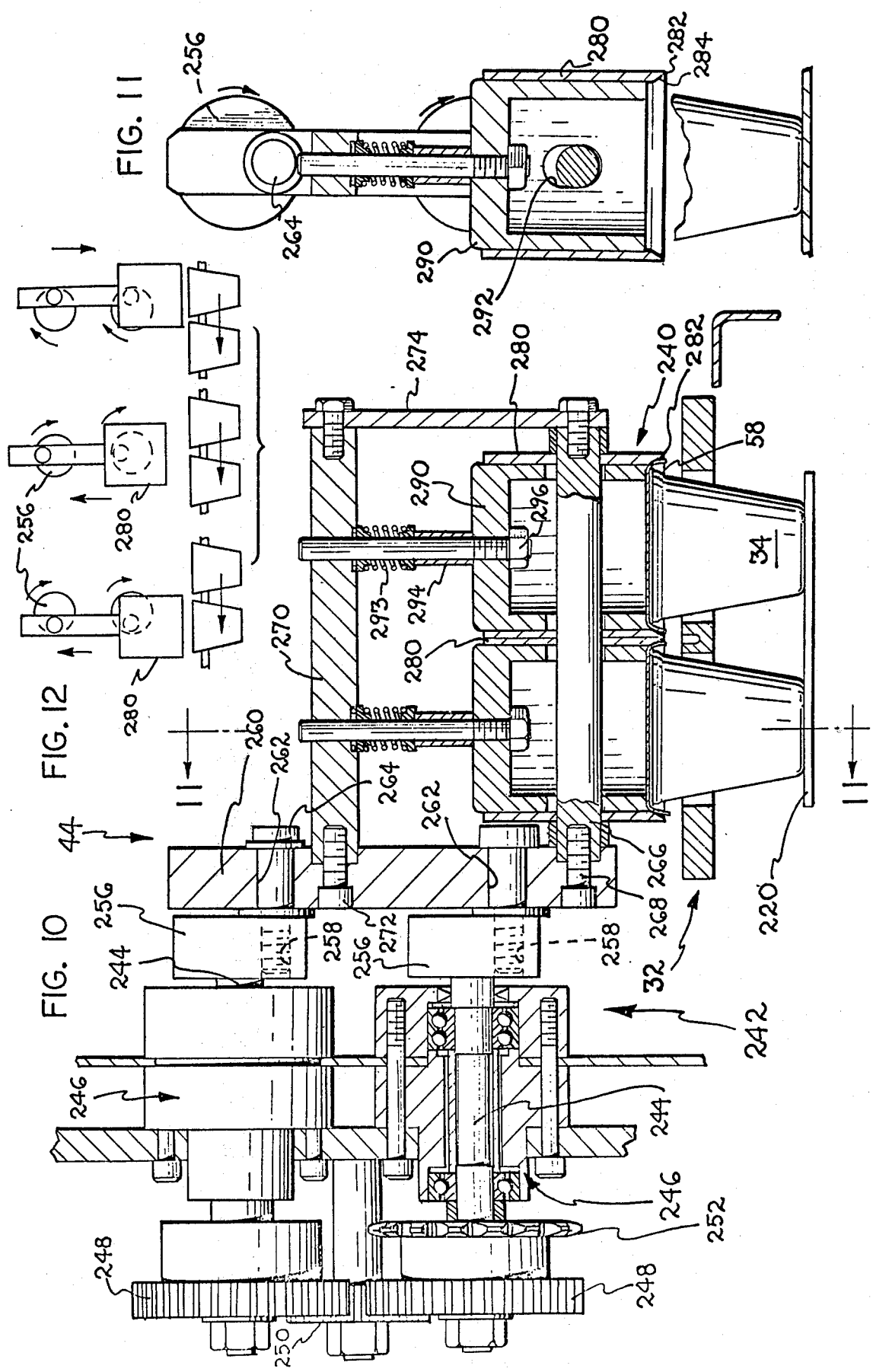

PACKAGING SYSTEM

This is a continuation of application serial no. 282,758, filed Aug. 22, 1972, now U.S. Pat. No. 3,838,550.

BACKGROUND OF THE INVENTION

Individual sealed containers in various sizes, shapes and forms have become increasingly popular in packaging numerous products, particularly of the flowable type.

Special types of packaging equipment have been developed that are capable of taking containers from a stack and transferring them to a conveyor which moves the containers along a predetermined path. The containers are then filled at a filling station and subsequently covers are applied to the respective containers at a cover applying station.

Heretofore, most of the machinery that has been developed for performing the above functions has been extremely complex and had to be operated on an intermittent basis, which substantially restricted the output of the equipment.

While some machines have been proposed which are capable of operating a continuous basis in filling and covering containers, the arrangement of the various stations still restricts the speed at which the machinery can be operated.

SUMMARY OF THE INVENTION

The present invention embodies a new concept of packaging flowable products in containers and sealing the containers, and the various stations for performing separate functions are designed with a view towards maximizing the output of the unit. More specifically, each of the various stations is designed to reduce the time required for performing the particular function without sacrificing reliability of the overall system.

The method of the present invention contains a novel system for insuring that containers are removed from a nested stack and properly positioned on a continuously moving conveyor in a minimum period of time. The filling station for placing the flowable product into the containers is designed to fill the container in separate stages to further enhance the primary purpose of increasing the productivity of the machine.

In one embodiment, the method also contemplates simultaneously processing a plurality of containers in separate rows and automatically sealing and folding the covers to a final configuration in a simple and efficient manner. In an alternate embodiment, a continuous web of material is utilized for covers for a plurality of longitudinally and transversely spaced containers and the containers are interconnected at spaced locations by selectively severing and folding certain portions of the endless web. Again, this is accomplished by automatic means that is capable of performing the function at an extremely rapid rate.

The apparatus for performing the above method consists of an endless apertured conveyor that is capable of receiving the plurality of rows of containers for movement along a path from a nested stack at the dispensing station. A vacuum motor produces a negative pressure below the openings in the conveyor at the dispensing station to reduce the necessary time required for moving the containers from the stack into the openings in the conveyor. The filling of the containers in stages is accomplished by separate filling nozzles that are longitudinally spaced along each row of containers and each nozzle partially fills each container in the row as the container is continuously moving along the path.

The means for applying closures or covers to the respective containers, consists of a continuous web of foil that has heat sealing characteristics thereon with means for heat sealing the surface to the adjacent surface of the rims of the containers and in one embodiment, the continuous web is then severed longitudinally and transversely to produce rectangular covers on each of the containers with the periphery of the covers extending beyond the periphery of the rims of the containers. In this embodiment, the portions of the covers extending beyond the periphery of the rim are then initially folded downwardly at a first folding station while the containers continue their movement along the path and subsequently pass between means that further folds the peripheries of the covers into engagement with the sides of the containers. Each corner of the cover defines a gripping element that may be used to ultimately remove the cover from the container.

In an alternate embodiment, at least two rows of containers are simultaneously processed and the web of material is of a width slightly greater than the width of the two rows of the containers. In this embodiment, the mechanism for applying the covers also includes severing means that sever only selected portions of the cover between the adjacent containers while maintaining a connection between the containers through the cover web. The severed portions are then again folded downwardly to provide gripping elements for ultimately removing the covers.

BRIEF DESCRIPTION OF SEVERAL VIEWS OF DRAWINGS

FIG. 1 is a perspective view of a filled and sealed container;

FIG. 2 is a side elevation view of the machine that accomplishes the automatic dispensing, filling and covering of the container shown in FIG. 1;

FIG. 2a is a fragmentary plan view of the vacuum applying means in the dispensing station;

FIG. 3 is an enlarged perspective view of the filling station for the machine shown in FIG. 2;

FIG. 4 is an enlarged vertical section of the cutting means forming part of the cover applying mechanism with the section taken generally along line 4—4 of FIG. 5;

FIG. 5 is a transverse section taken along line 5—5 of FIG. 6;

FIG. 6 is an enlarged perspective view of the severing station of the machine;

FIG. 7 is an enlarged fragmentary sectional view as viewed on line 7—7 of FIG. 6;

FIG. 8 is an enlarged vertical section through the cover applying station shown in FIG. 2;

FIG. 9 is a section as viewed along line 9—9 of FIG. 8;

FIG. 10 is an enlarged sectional view through the first folding station for folding the covers with respect to containers;

FIG. 11 is a sectional view as viewed along line 11—11 of FIG. 10;

FIG. 12 is a schematic illustration of three stages or positions for the first folding mechanism shown in FIG. 10;

FIG. 18 (appearing with FIG. 6) is an end view with certain parts broken away of the first folding station for producing the alternate form of the container and cover arrangement shown in FIG. 15;

FIG. 19 (appearing with FIG. 6) is a section as viewed along line 19—19 of FIG. 18;

FIG. 20 (appearing with FIG. 6) is a view taken along line 20—20 of FIG. 18 with the containers being deleted.

DETAILED DESCRIPTION

Figure 13:
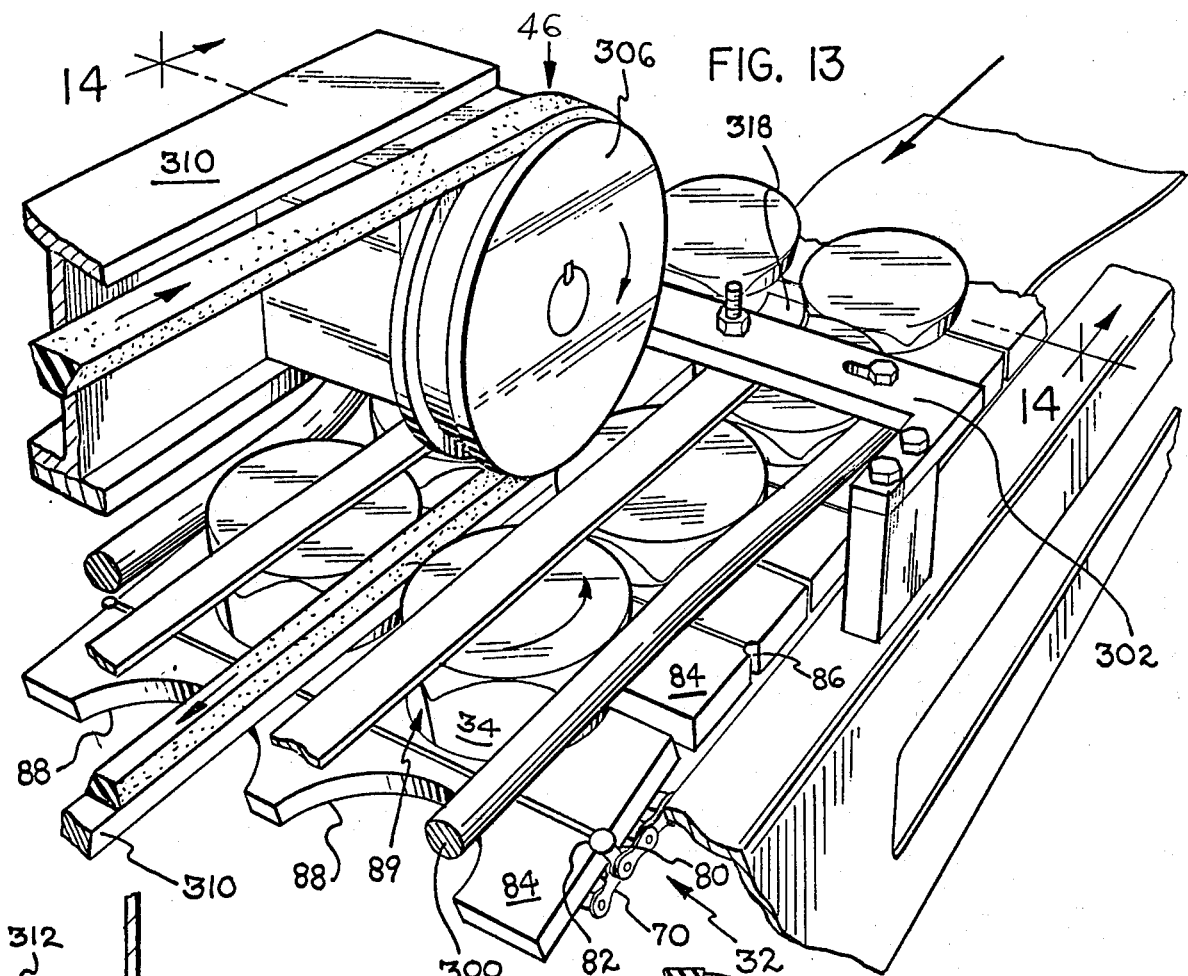
FIG. 13 is an enlarged fragmentary perspective view of the second folding station in the machine of FIG. 2.

While this invention is susceptible of embodiment in many different forms, there is shown in the drawings and will herein be described in detail several embodiment, with the understanding that the present disclosure is to be considered an an exemplification of the principles of the invention and is not intended to limit the invention to the embodiments illustrated.

GENERAL PACKAGING SYSTEM

The overall packaging apparatus of the present invention is illustrated at 30 in FIG. 2 and includes a common drive mechanism (not shown) for driving all of the moving parts of the apparatus. The apparatus or machine 30 includes endless driven conveyor means 32 that defines a path for a plurality of containers 34 which are supplied to the conveyor at a dispensing station 36. After the containers have been inserted into the apertured conveyor (to be described later), the containers are moved past a filling station 38 where flowable product is placed into the containers while they are being continuously moved along the path by conveyor means 32. The filled containers are then moved to a cover applying station 40 where a continuous web of cover material is heat sealed to the containers. The cover applying station 40 also incorporates a cutting station 42 where the continuous web of material applied to the containers is severed into individual covers and thereafter the covers are folded with respect to the container at a first folding station 44 and a second folding station 46 and exit from the apparatus at 48 to a further conveyor 49 for future packaging and shipment.

THE PACKAGE

The completed package 50 is shown in FIG. 1 and consists of container 34 that has a circular bottom wall 54 and circular side wall 56 extending upwardly therefrom with a circular rim 58 extending outwardly from the upper end of the side wall. Container 34 may be formed of any suitable thermoplastic material by conventional techniques well understood to those skilled in the art, and the side wall may be ribbed (as illustrated), smooth, plain, or decorated, as is also well understood in the art. The container rim 58 defines a generally flat upper surface 60 (FIGS. 3 and 6) upon which a cover consisting of a rectangular flexible sheet having heat sealing characteristics on at least one surface thereof is sealed to the flat upper surface. Since one of the primary uses of containers 34 is in the packaging of liquids, the seal between the cover and container rim is effectively circumferentially continuous and leakproof. The cover is preferably formed of a material that will take on a permanent set when folded on bent, and a metallic foil such as aluminum is well suited for the purposes of the present invention. The foil may be coated, or otherwise suitably treated, on the side facing the container rims with a heat sealable substance that is compatable with the material from which the containers are made. The present invention also contemplates that a layer of heat sealable material may be laminated to a carrier foil, and that the cover may be formed entirely of an inherently heat sealable material, such as a thermoplastic sheet. The term "film" as used herein and in the appended claims is intended to cover all such examples of cover materials. The rectangular, flexible foil sheet, which is preferred because of its ability to take on a permanent set, has a peripheral edge 64 that extends beyond the rim 58 and is tucked or folded under the rim. The rectangular sheet defines four corners 66 (only two being shown in FIG. 1) that extend substantially below the rim and each corner defines a gripping mechanism for removing the cover from the container to allow removal of the contents.

It will be appreciated that the particular configuration of the cover structure for the container which results in four gripping portions or tabs is of considerable benefit in this field. Because of the characteristics of the aluminum foil thaat is utilized for the cover structure, in many instances, where a single tab is provided for removing the cover, the foil may tear during removal resulting in considerable difficulty in removal of the portion of the foil that remains on the container. However, with four tabs as shown in the container of FIG. 1, the entire cover, even when portions thereof are severed during removal, can be removed by grasping the appropriate number of tabs.

CONVEYOR MEANS

Before describing the conveyor means 32, it should be noted that the packaging apparatus 30 illustrated in the drawings is specifically designed for simultaneously processing a plurality of rows of containers and two such rows have been shown for purposes of illustration. However, any greater or lesser number of rows could readily be incorporated into a machine or apparatus of the type disclosed without departing from the spirit of any of the various aspects of the invention.

Conveyor means 32 (FIG. 13) consists of a pair of endless chains 70 with each chain 70 entrained over a drive sprocket 72 (FIG. 2) and a driven sprocket 74 respectively supported on shafts 76 and 78 located adjacent opposite ends of the packaging apparatus. Each chain 70 (FIG. 13) has a plurality of studs 80 extending upwardly therefrom at spaced locations with each stud having an enlarged button 82 at the upper end thereof.

A plurality of plates 84 extend between the respective chains 70 and have recesses 86 on opposite ends thereof which are adapted to receive the studs 80 and the apertured recesses are smaller than the enlarged buttons 82. In this way, the respective plates can readily be inserted by transverse deflection of the chains and forcing the studs 80 into the recesses.

Each of the plates 84 has first and second pairs of semi-circular recesses 88 extending from opposite side of the plate. Two of such recesses in adjacent pairs of plates 84 define openings or apertures 89 for receiving the respective containers, as will be described later.

CONTAINER DISPENSING STATION

The container dispensing station 36 is most clearly shown in FIGS. 2 and 2a and consists of first and second storage compartments 100 for storing first and second groups of nested open topped rimmed containers 34. The lower ends of the respective compartments have container releasing mechanisms 102, each of which consists of a hub 104 having an internal retaining mechanism (not shown) that normally holds all of the containers in the stack. A releasing rod 106 extends from each of the mechanisms 102 and rod 106 is connected to one end of a lever 108 pivoted intermediate its ends at 110 on a support 111. The opposite end of the lever 108 is connected to an actuating rod 112 which has a connection 114 at its opposite to driven member 116. Driven member 116 is rotated by the drive mechanism (not shown) so that a pair of containers 34 are simultaneously released form the respective stacks in synchronized relation with the movement of conveyor means and fall by gravity towards openings 89 defined in conveyor means 32.

Since the dispensing mechanism is commercially available and forms no part of the present invention, a further detailed description thereof does not appear to be necessary.

As was indicated above, the entire packaging apparatus is designed for increasing the productivity of the machine without sacrificing reliability and operational efficiency.

In order to increase the speed at which the machine or apparatus 30 may be operated, dispensing station 36 includes novel apparatus for decreasing the time required for the containers to be deposited into the openings 89 after they have been released from the respective stacks. For this purpose, dispensing station 36 also includes means for producing a negative pressure below the stacks of nested containers to positively draw the containers into the openings 89. This means is most clearly shown in FIGS. 2 and 2a and consists of a vacuum pump 120 which has first and second conduits 122 connected thereto. The other ends of the respective conduits 122 are connected to vacuum chambers 124 and each vacuum chamber consists of a tray having a flat bottom wall 126 which has an opening 128 to which the conduit 122 is connected. The vacuum chamber 124 further has an upwardly and outwardly inclined side wall 130 which extends from the sides and rear of the flat bottom wall 126. The chamber 124 is open at the top and the end extending toward the exit end of the apparatus.

With the arrangement described, a negative pressure will be developed in each of the vacuum chambers 124 and will positively draw the containers into the opening 89 in the conveyor after they have been released from the respective stacks. The vacuum chambers considerably reduce the time required for placing the containers in the openings, thereby allowing the machine to be operated at a greater speed.

FILLING STATION

The filling station 38 is likewise specifically designed to increase the speed at which the machine or apparatus may be operated. The filling station 38 is most clearly shown in FIG. 3 and consists of a plurality of filling means 130 that are longitudinally spaced along the path and each filling means partially fills each container moving along the path so that the containers are filled in steps or stages as they are moving along the path.

Each filling means 130 consists of a fixed bracket or support 132 that has a plurality of nozzles 134, one for each row of containers, secured thereto and each nozzle 134 is connected to a manifold (not shown) that has a suitable product supplied thereto from a pump (not shown). The material supplied through each nozzle 134 is again supplied in synchronized relation to the movement of the containers so that each charge is released while the container is under the nozzle.

Thus, as the containers are moving along the path defined by conveyor means 32, a partial charge of material is placed into the respective containers by each of the filling means. For example, the present invention is specifically illustrated in packaging individual portions of liquid such as fruit juice, milk or any other flowable products and, in the illustrated embodiment, two filling means are illustrated with each filling means placing a partial or one-half of the amount of flowable product or liquid that is to be placed into the containers during the filling process. However, it will be appreciated that any number of such partial fillings may be utilized to increase the speed of the packaging apparatus. For example, four such filling means could be longitudinally spaced along the path and each of the filling means would be placing a ¼ charge of liquid in the containers. Again, as previously noted, this could simultaneously be done at four different positions along the path and the liquid or material could be supplied from a common manifold that would be simultaneously supplying the material to all of the hoses 136.

It will be appreciated that the plural filling means in the filling station have considerable advantage over a single filling means. In a single filling means, the speed of the conveyor means is limited to the amount of time required for placing a product from a fixed source into the container which, when moving at a continuous rate, is only under the single nozzle a short period of time. However, with the filling station described, the speed of the conveyor means for the containers can be increased in multiples, determined by the number of nozzles utilized in each row of containers.

COVER APPLYING STATION

The cover applying station 40 is most clearly shown in FIGS. 2, 8 and 9 and incorporates novel mechanism for heat sealing the over structure 62 to the rims of the containers. A continuous web 144 of foil having heat sealing material on one surface therof is supported in a form of a roll 140 on a shaft 142 that is rotated on the housing for the packaging apparatus 30. The continuous web 144 of foil is entrained over heating means 146 which acts as a guide for the web and also incorporates means for securing the web to the upper surface 60 of the container rim 58. When indicia is provided on the fooil, suitable means may be provided for insuring that the indicia are in registration with the individual containers, as is well understood in the art.

The novel heat sealing means 146 is shown in detail in FIGS. 8 and 9 and consists of a fixed circular drum 150 that is supported on an upright member 152 through elements to be described later. The hollow fixed circular member has a plurality of openings 154 at circumferentially spaced locations and each opening 154 receives a heating element 156. The plurality of heating elements extend beyond the drum and are fixedly secured to the upright 152 through nuts 158 so that the heating elements act as the support for maintaining the drum 150 in a fixed position above the path defined by conveyor means 32. While four such heating elements 156 have been shown in FIGS. 8 and 9, any number could be utilized to maintain the peripheral surface of the fixed drum at the predetermined temperature, which is controlled by thermocouple 159.

The heat sealing means 146 further includes a freely rotatable hollow drum 160 that is supported for rotation about a fixed axis defined by a shaft 161 rotatably supported in bearing structure 164 carried on the housing of the machine. The freely rotatable drum 160 has a peripheral surface 162 that is located in the path of movement of the rims and the web 144 of foil is inserted between the periphery of the hollow drum 160 and the container rims 58, as most clearly shown in FIG. 8. The drum 160 is preferably formed to maximize heat transfer from the fixed drum 160 to the foil web 144 while having some elastic characteristics. For this purpose, the drum has an inner core 167 of aluminum with an outer sleeve of elastomeric material 168 such as silicon rubber. The heat supplied from the fixed drum 150 will be transferred to the freely rotatable drum 160 and heat the foil in the web 144 sufficiently to elevate the temperature of the heat sealing material and produce a strong bond between the upper surface of the rims 58 and the foil. At the same time, the elastomeric material will accommodate some deflection of the peripheral surface relative to the container rims.

According to one aspect of the invention, the heat transfer between the fixed drum and the freely rotatable drum is increased by producing an irregular surface 166 on the periphery of the fixed drum 150 to thereby increase the exposed surface area on the peripheral surface of the fixed drum. Any manner of increasing the surface area may be utilized and, in the illustrated embodiment, the irregular surface is shown as being produced by forming a thread on the peripheral surface 166.

While any type of heating element 156 may be utilized, the illustrated embodiment shows the elements as being electrical heating elements supplied with current through a cord 170 that extends through a hollow rod 172 located above the heating means 146. The hollow rod 172 also acts as a support for the upright 152.

In the particular machine illustrated in FIG. 2, two such heating means 146 have been illustrated as being located at longitudinally spaced locations along the path defined by conveyor means 32. In the specific apparatus shown, the second heating means 146 is located downstream of the severing mechanism (to be described later). It will be appreciated that the location of the second heating means could be in juxtaposed relation to the first heating means and, also in some instances, the second heating means could be eliminated.

Summarizing the web applying means, the roll of foil is freeely rotated on the shaft 42 and is drawn into the path by the leading portion which has already been connected to the container rims so that the driving of the conveyor means will automatically draw the web 144 from the roll 140 at the speed or rate at which the conveyor means is moving. In order to insure that the web remains taut, it may be desirable to connect an adjustable brake (not shown) to the end of the shaft 142 so that a predetermined tension may be maintained on the web 144.

CUTTING STATION

The cutting station 42 for sequentially severing a continuous web of material is most clearly shown in FIGS. 4 through 7 and consists of a substantially circular member 180 that is driven by the common drive means (not shown) for the machine through a shaft 182 rotated on the housing of the apparatus 30. The connection between the shaft 182 and the circular member or hollow drum 180 is made through a plurality of bolts 184 that extend through the elongated slots or openings 186 in the end 188 of the drum. The elongated openings 186 allow for accurate positioning of the cutter blades (to be described later) with respect to the conveyor means 32.

Circular member 180 has a plurality of circumferentially spaced axially extending recesses 190 on the peripheral surface thereof and at least one circumferential recess 192. The number of recesses 192 will depend upon the number of rows of openings in conveyor means 32, and the number of recesses 190 depends upon the circumference of drum 180, the size of the containers being filled and the spacing of the containers on the conveyor means. The axially extending recesses 190 (FIG. 7) each have a planar wall 194 that is parallel to and offset from a radius of the drum 180, and recesses 190 each have an opposed wall 196 that has at least a portion 198 of which is outwardly inclined with respect to the planar wall 194. A cutting blade 200 is inserted into each recess 190, with one surface of each blade engaging a planar wall 194 of the recess. The inner edge of each blade 200 is seated on the base of the recess 190, and its cutting edge 202 extends beyond the periphery of the drum 180. Each blade 200 is held in a recess 190 by a wedge element 204 that has a planar surface 206 engaging the opposite surface of the blade 200 and an opposite surface 208 which has an inclination that corresponds with the inclination of the outwardly inclined portion 198. Blades 200 are releasably retained within the recesses 190 by releasable retaining means in the form of bolts 209 that extend radially of drum 180 and through openings in the wedge element. The threaded bolts 209 force the wedge elements towards the base of the recesses and hold the blades 200 against the planar walls 194. This arrangement greatly simplifies the removal and replacement of the blades with respect to the drum 180. In the illustrated embodiment, where only two side-by-side rows of containers are filled, wedge elements 204 are provided with a recess in the midportion, and these recesses have an inclined bottom surface 204a (FIG. 5) to provide a clearance for the vertical cutting means described below.

The circumferentially extending recess 192 is identical in cross-sectional configuration to recesses 190, with the planar wall 194 thereof extending perpendicular to the axis of the drum 180. The vertical cutting means includes a plurality of circumferential blade segments 210 that are releasably retained in the recesses 192 by wedge elements 212 similar in cross-sectional configuration to the wedge elements 204. Blade segments 210 include an arcuate inner edge 210a (FIG. 5) that seat upon the base of recess 192, and an inclined end portion 210b that is positioned in spaced relationship with respect to wedge surface 204b.

In order to insure that the blades 200, 210 completely sever the web 144 into rectangular cover structures 62, endless conveyor means 32 preferably has transversely extending recesses 214 (FIG. 6) and longitudinally extending recesses 216 that are respectively aligned with the blades 200 and 210 so that the blades may be moved below the upper surface of the conveyor and completely sever the web.

FIRST FOLDING STATION

The first folding station 44 is shown in detail in FIGS. 10 and 11 and includes first means for initially folding the cover portions extending beyond the rims of the containers downwardly while the containers are moving along the path. The first folding station includes first folding means consisting of a support 220 that is located below conveyor means 32 and support 220 maintains the rims of the containers above the upper surface of the conveyor means.

The configuration of the support 220 is shown in side elevation in FIG. 2 and consists of a ramp that has a first portion 222 for initially engaging the bottoms of the containers as they are moving along the path, an inclined portion 224 which raises the upper rims of the containers above the conveyor, a third portion 226 located in the first folding station 44, a further upwardly inclined portion 228 between the first and second folding stations 44 and 46 and a final flat portion 230 in the area of the second folding station. The first inclined portion 224 thus raises the container rims from a supported position on the conveyor means to a second position where the rims are spaced above the upper surface of the conveyor means at the first folding station 44.

The first means in the first folding station also includes plunger means 240 for engaging the covers beyond the rims of the containers and drive means 242 for moving the plunger means in a generally arcuate or closed loop path above the conveyor means.

The drive means 242 consists of first and second shafts 244 that are rotatably supported by bearing structures 246 in the housing of the packaging apparatus 30. The outer ends of the shafts 244 each have a gear 248 secured thereto and each gear 248 is in mesh with an idler gear 250. The lower shaft 244 is driven through a drive sprocket 252 from the common drive means (not shown) so that both shafts 244 are simultaneously rotated in the same direction at the same speed.

The opposite ends of the respective shafts 244 each have a member 256 secured thereto with each member having an opening 258 eccentric with respect to the shaft 244. An elongated plate 260 has a pair of vertically spaced openings 262 that each receive a bolt 264, and the bolts are threaded into the openings 258. The openings 262 and the bolts 264 are configured to allow relative rotation between the plate 260 and the bolts 264.

A support structure is secured to the plate 260 and consists of a rod 266 secured to the lower portion of the plate 260 through a bolt 268. An upper rod 270 is likewise secured to the plate 260 through a bolt 272. The outer ends of the two rods are interconnected through a further plate 274.

Plunger means 240 for each row of containers is carried by the support structure and consists of a hollow circular member 280 that is carried by the lower rod 260 and has a lower edge 282 conforming generally to the configuration of the periphery of the rim 58 on the container 34. As most clearly shown in FIG. 11, the hollow member 280 has an upwardly and inwardly inclined surface 284 so that the lower edge 282 initially engages the cover structure 62 slightly outwardly of the container rim and the inclined surface defines an inclined ramp to positively move the cover structure extending beyond the rim of the container to the downward position shown in FIG. 10.

The folding mechanism further includes an inner or plunger member 290 supported for reciprocal movement with in the outer member 280. The inner plunger member 290 engages container cover structure above the rim and further insures that a proper bond has been produced between the foil and the adjacent surface of the container rim. The inner hollow member 290 has an elongated opening 292 through which rod 266 extends and the elongated opening allows for the reciprocal movement of the inner plunger with respect to the outer member or plunger 280.

The inner plunger 290 is resiliently biased towards the path by biasing means in the form of a spring 293 having an upper end in engagement with the rod 270 and a lower end engaging a sleeve 294 that is threaded on a bolt 296 which extends through an opening in inner hollow member 290 and an opening in rod 270. With this arrangement, the spring 293 exerts a downward force on the inner hollow member or plunger to produce a bonding force between the foil and the container rim.

Summarizing the first folding mechanism, the drive means 242 simultaneously drives the plunger means 240 in a circular path through the positions illustrated in FIGS. 11 and 12. By properly synchronizing the speed of rotation of shafts 244 with the speed of conveyor means 32, the lower edges 282 of the hollow members 280 are vertically reciprocated into and out of engagement with the foil outwardly of the rims of the containers simultaneously being moved along the path at the same speed as the containers. Again, the arrangement of the first folding mechanism is such that the folding mechanism can readily be adapted to the speed of the conveying mechanism.

SECOND FOLDING STATION

Figure 14:
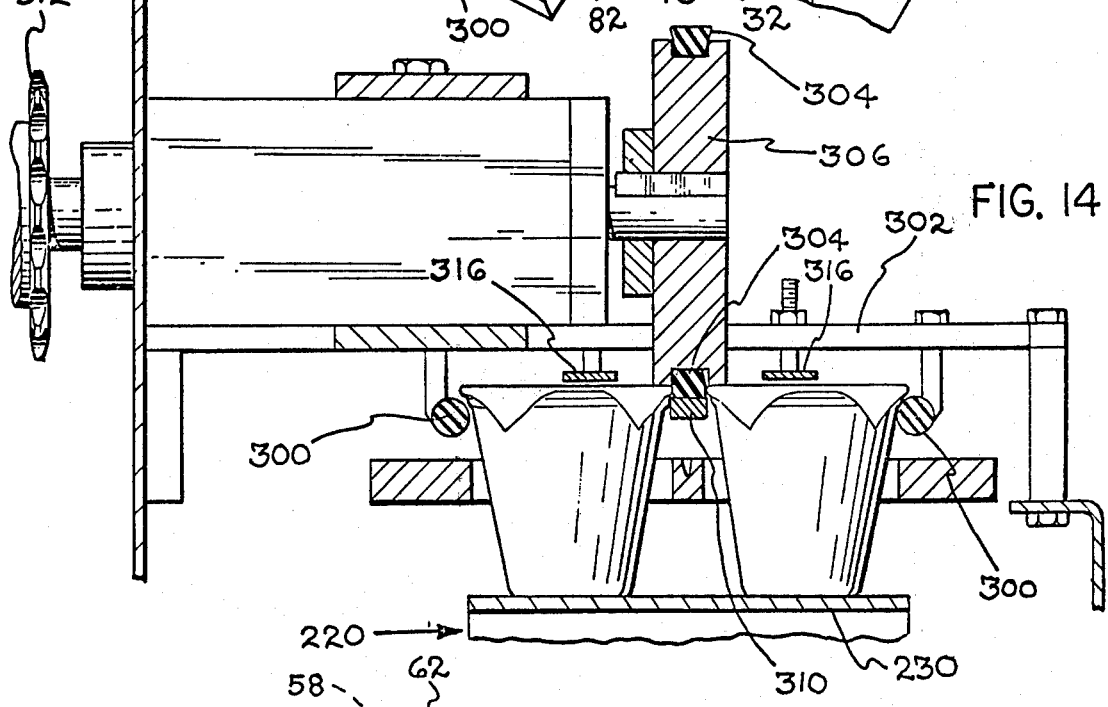
FIG. 14 is a section taken generally along the line 14—14 of FIG. 13.
Figure 14A:
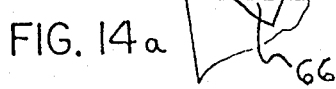
FIG. 14a is a fragmentary view similar to FIG. 13 showing the relationship of the container with respect to certain elements in the second folding station.

The second folding station 46 incorporates second means for engaging the initially folded covers which are in the position shown in FIGS. 10 and 14 to a finally folded position where the peripheral edge of the cover is below the rim and in engagement with the side of the container. The second folding means is most clearly shown in FIGS. 13 and 14 an includes fixed rails 300 which are supported on a pair of transverse members 302 located above the path (only one being shown) with each fixed rail being located on one side of a row of containers. The second folding means further includes moving belt means in the form of an endless V-shaped belt 304 that is entrained about drive pully 306 (FIG. 2) and driven pulley 308 supported for rotation about a fixed axis on a support structure 310. The movable belt means is located between the spaced fixed rails 300 and the spacing between adjacent edges of the belt means and the adjacent surface of the fixed rail is less than the diameter of the rims of the containers. The belt 304 is maintained in a fixed horizontal plane aligned with the fixed rails 300 through a guide support member 316.

In operation, drive pulley 306 is driven through sprocket 312 from the common drive means in synchronized relation with the speed of the conveyor means. The conveyor means 32 moves the containers from the first folding station 44 upwardly along inclined portion 228 of ramp 220 so that the rims 58 of the containers are located above the fixed rails 300. Thereafter, the continued movement of the containers by the endless conveyor means 32 will move the containers off the end of the ramp 220 so that the containers are supported at opposite sides below the edges of the rim 58. Since the endless belt 304 acts as a movable rail engaging one side of a container, the opposite side of which is in engagement with the fixed rail 300 the containers will continue their movement along the path by the driving of the movable rail or endless belt and will simultaneously be rotated by being rolled along the fixed rails. During this rotation or rolling movement along the fixed rail, the weight of the container and product will hold the lower edges of the container rims in engagement with the circular fixed rails 300 and will automatically fold the periphery of the cover 62 under the rim and in engagement with the side walls of the containers. In order to insure that the containers are maintained in engagement with the rails 300, it is desirable to have fixed guide means 316 located above the containers and centrally positioned between the fixed rails and the movable rail. The guide means 316 may have an upwardly inclined arcuate portion 318 adjacent the inlet end of the second folding station to insure that the containers are moved downwardly into in engagement with the rails and endless belt means.

SUMMARY

The method of the present invention will be described in connection with the brief summary of the operation of the apparatus that has been described above.

When the common drive means for the entire apparatus is actuated, conveyor means 32 begins its motion and a container 34 is simultaneously released from each of the respective stacks of nested containers above the moving conveyor for deposit by gravity into the openings in the conveyor. The negative pressure created in the respective chambers 124 below the conveyor below the conveyor means positively draws the containers into the opening with the lower surfaces of the rims engaging the upper surface of the conveyor.

The supported containers are then moved along the path into the filling station where the first filling means 130 places one-half of the desired amount of product into the container as it is moved below the nozzles 134, and the second filling means 130 completes the filling operation. The containers then move to the cover applying station where the continuous web 144 of cover structure is heated by the heating means 146 and automatically bonded to the upper surface of the container rims. It should be noted that the continuous web 144 of material is withdrawn from the roll 140, as needed, because the leading edge of the web downstream of the first heating means 146 is already secured to the container so that the conveyor means 32 draws the web of material from the roll.

The continuous web of material with the containers secured thereto is then moved into the cutting station 42 where the web is severed longitudinally annd transversely between each adjacent pair of containers to produce a plurality of flat rectangular covers 62 as shown in FIG. 6. The individual containers and covers then may be passed under a further heating means 146 to further insure that the covers are properly bonded to the upper surfaces of the container rims.

The continued movement of the containers by conveyor means 32 will then cause the bottom walls to engage the flat portion 222 of the rammp or support 220 and will cause the containers to move up the inclined portion 224 onto the flat portion 226 of ramp 220 in the first folding station 46. As the containers approach the plunger means 240, the plunger means are in the position shown in the right hand portion of FIG. 12 and the circular motion of the plunger means 240 will simultaneously produce a downwardly component as well as a second horizontal component along the path, the latter of which is equal to the speed at which the containers are moving along the path. The hollow member 280 will automatically initially fold the rectangular covers so that the periphery of each cover is located below the edge of the associated rim, while the inner plunger 290 will be resiliently biased into engagement with the foil by the spring 293.

The moving conveyor will then cause the containers to move along the second inclined portion 228 of the ramp 220 and onto the flat portion 230 located in the second folding station. At this time, the containers are supported on the flat portion 230 of the ramp 220 and are being moved along the path by the conveyor means 32. The rotational movement of the containers is initiated at this point by the moving belt 304. When the containers reach the end of the ramp, the weight thereof will cause the rims to be supported on the circular fixed rail 300 at one side and be in engagement with the moving belt along the outer edge of the fixed rim. By proper synchronization of the speed of the moving belt 304 with the conveyor means 32, the containers will be moved at the same speed after they leave the conveyor means and will simultaneously be rotated about their centers by being rolled along the fixed rails. When the containers 34 reach the ends of the rails 300, they are deposited on further conveyor means 49 for futher packaging and shipment.

ALTERNATE EMBODIMENT OF CUTTING AND FOLDING STATIONS

In some instances it may be desirable to have the containers exiting from the packaging machine in interconnected groups of predetermined numbers. This can readily be accomplished by slight modification of the severing station 42 and the first folding station 44 as well as the deletion of the second folding station 46.

Figure 15:
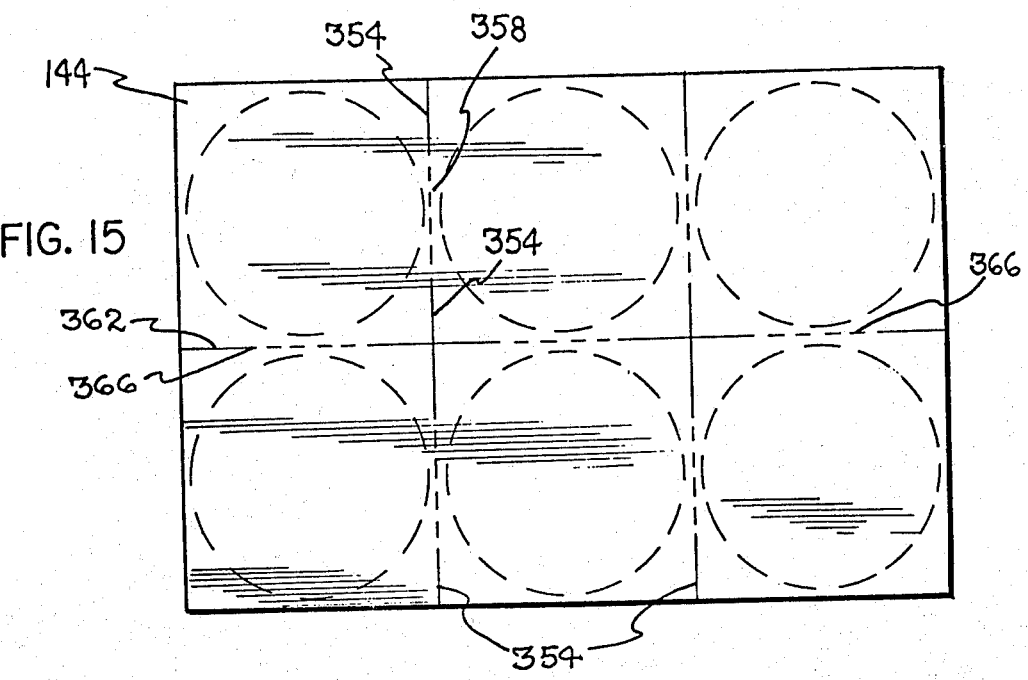
FIG. 15 is a plan view of a slightly modified form of container and cover group (before folding the cover) capable of being produced with the machine, in modified form, shown in FIG. 2.
Figure 16:
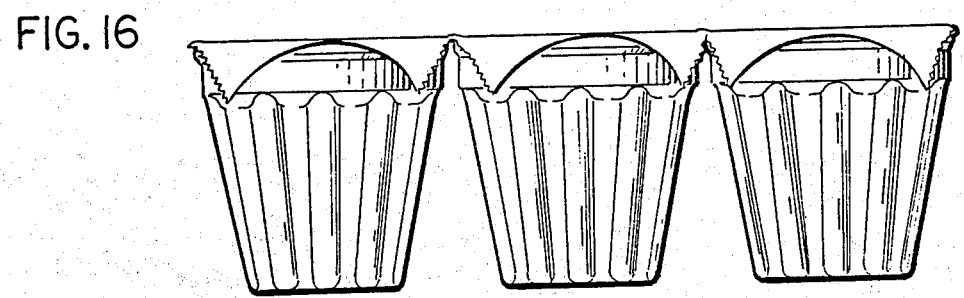
FIG. 16 is a side elevation of the containers and covers with the covers in their final folded position.
Figure 17:
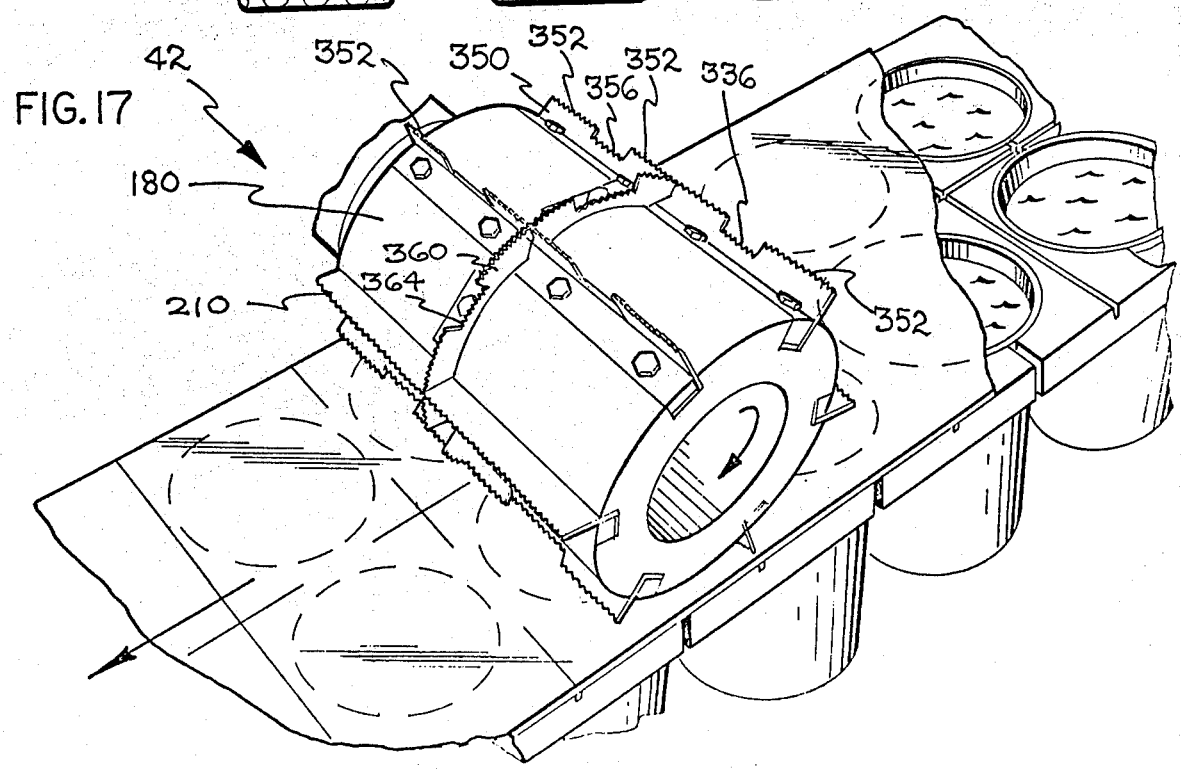
FIG. 17 is a view similar to FIG. 6 showing a modified form of cutter means utilized for producing the product shown in FIG. 16.

The modified form of this invention is disclosed in FIGS. 17 through 20 for producing interconnected groups of six containers shown in FIGS. 15 and 16, each of which is connected to at least the two next adjacent containers.

The cutting station 42 is modified by replacing four of the six transversely extending cutting blades 200 with blades 350 that have first portions 352 that partially sever the web 144 at selected locations 354 shown in FIG. 15. The cutting blade 350 also has recessed second portions 356 located between the first portions 352 to perforate the web 144 at 358 while maintaining a connection in this area between two adjacent containers.

Likewise, the circumferentially extending blades 210 again have first portions 360 for producing cuts 362 and recessed second portions 364 for producing the perforations 366. The two continuous cutting blades 210 will perform the same function as previously described and sever the webs 144 from one edge to the other.

With this arrangement, the containers will emerge in six pack groups with the cover structure being severed and scored or perforated as shown in FIG. 15. The severed portions of the web may then be folded down by a modified form of plunger means 240a (FIGS. 19 and 20) which is very similar to construction to plunger means 240, except that the hollow member 280a has a plurality of cutout segments 370 remove from the lower edge 282a with the circumferentially spaced cutout segments 370 being aligned with the unsevered portion or perforated portions 358 and 366.

With the alternate arrangement, the groups of six containers will emerge from the apparatus 30 in the condition shown in FIG. 16 where the respective corners of the rectangular cover structures are folded downwardly below the rims of the containers while the perforated or scored portions of the web 144 maintain a connection between ajacent containers. The folding of the severed portions of the web produces a neat package and the openings defined in the respective adjacent groups of four containers can readily be utilized for insertion of the fingers when the containers are ultimately used and are separated.

In either embodiment of the invention, the speed of the machine can readily be adjusted to fit the desired needs. The speed can readily be increased by increasing the amount of negative pressure created at the dispensing station and increasing the number of filling heads located along each row in the filling station. The packages produced by the method and apparatus of the present invention are extremely easy to open, not only because of the relatively large, readily accessible gripping tabs; but also because these tabs are serrated during the cover severing step, which makes them easy to grip and lift away from the container side wall.

I claim:

1. A package for storing a product comprising a plastic container having a circular bottom wall and a side wall extending upwardly therefrom with a circular rim extending outwardly from the upper end of said side wall, said rim defining a generally flat upper surface having a circular peripheral edge, and a cover including a rectangular flexible sheet of film having sealing characteristics on one surface with said surface sealed to only said flat upper surface, said sheet being formed of a material that is capable of taking on a permanent set and said sheet having a peripheral edge extending beyond said rim and being tucked around said circular peripheral edge of said flat upper surface and under said rim, said rectangular sheet having generally triangularly shaped corners extending substantially below said rim and each corner being free from said container below said circular peripheral edge to define a gripping member for removing said cover from said container to allow removal of said contents.

2. A package as defined in claim 1, in which the container rim is centered with respect to said rectangular sheet.

3. A package as defined in claim 1 wherein said gripping portions are serrated.

4. A package for storing a product comprising: a plurality of spaced plastic containers, each container having a circular bottom wall and a side wall extending upwardly therefrom with a circular rim extending outwardly from the upper end of said side wall, said rims lying in a common plane defining a generally flat upper surface and each rim terminating in a circular peripheral edge; and a cover for said containers, said cover including a rectangular flexible sheet of film having heat sealing characteristics on one surface with said surface sealed to said rims, said sheet being selectively severed between said containers to provide flap portions,, the unsevered portions of said sheet providing connecting webs for retaining said containers in association as a unit, said sheet being formed of a material that is capable of taking on a permanent set and the flap portions of said sheet defining a peripheral edge extending beyond each rim and being folded around said circular peripheral edges of said flat upper surfaces and downwardly relative to said rims to form generally triangularly shaped corners extending substantially below said rim and each corner being free of the adjacent container side wall to define a gripping member for removing said cover from said container to allow removal of said contents.

5. A package as defined in claim 4 wherein the unsevered portions of said sheet are perforated to facilitate removal of individual containers from said package.

6. A package as defined in claim 4 wherein said gripping portions are serrated.

7. A package for storing a product comprising a container having a bottom wall and a side wall extending upwardly therefrom with a rim extending outwardly from the upper end of said side wall, said rim defining a generally flat upper surface having a circular peripheral edge, and a cover including a rectangular flexible sheet of film having heat sealing characteristics on one surface with said surface sealed only to said flat surface, said sheet being formed of a material that is capable of taking on a permanent set and said sheet having a peripheral edge extending beyond the circular peripheral edge of said upper surface and being tucked around said circular peripheral edge, said rectangular sheet having generally triangularly shaped corners extending substantially below said rim and each corner being free from said container side wall below said circular peripheral edge to define a gripping member for removing said cover from said container to allow removal of said contents.

* * * * *

UNITED STATES PATENT OFFICE
CERTIFICATE OF CORRECTION

PATENT NO. : 3,976,196

DATED : August 24, 1976

INVENTOR(S) : Martin Mueller

It is certified that error appears in the above-identified patent and that said Letters Patent are hereby corrected as shown below:

Column 3, line 30, "embodiment" should be --embodiments--.

Column 4, line 37, "thaat" should be --that--.

Column 5, line 6, "side" should be --sides--.

Column 5, line 28, "form" should be --from--.

Column 6, line 57, "over" should be --cover--.

Column 6, line 66, "fooil" should be --foil--.

Column 7, line 67, "freeely" should be --freely--.

Column 10, line 16, "The folding" should be --The first folding-

Column 10, line 18, "with in" should be --within--.

Column 10, line 45, "containers simultaneously" should be --containers while simultaneously--.

Column 10, line 58, "an" should be --and--.

Column 11, line 50, delete "below the con-".

Column 11, line 51, delete "veyor below".

Column 12, line 3, "annd" should be --and--.

Column 12, line 12, "rammp" should be --ramp--.

UNITED STATES PATENT AND TRADEMARK OFFICE
CERTIFICATE OF CORRECTION PAGE 2 OF 2

PATENT NO. : 3,976,196
DATED : August 24, 1976
INVENTOR(S) : Martin Mueller

It is certified that error appears in the above-identified patent and that said Letters Patent are hereby corrected as shown below:

(continued)

Column 14, line 22, "tions,," should be --tions,--.

Column 14, line 48, "to said flat sur-" should be --to said flat upper sur---.

Column 14, line 52, "of said upper" should be --of said flat upper--.

Signed and Sealed this

Eleventh Day of January 1977

[SEAL]

Attest:

RUTH C. MASON
Attesting Officer

C. MARSHALL DANN
Commissioner of Patents and Trademarks